(12) United States Patent
Van Hillo et al.

(10) Patent No.: US 8,568,208 B2
(45) Date of Patent: Oct. 29, 2013

(54) DEBONER FOR POULTRY PARTS, SUCH AS THIGHS OR DRUMSTICKS

(71) Applicant: Meyn Food Processing Technology B.V., Oostzaaan (NL)

(72) Inventors: Eric Adriaan Van Hillo, Oostzaan (NL); Jan Willem Hagendoorn, Oostzaan (NL); Bas Nagel, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/687,463

(22) Filed: Nov. 28, 2012

(65) Prior Publication Data
US 2013/0137351 A1    May 30, 2013

(30) Foreign Application Priority Data

Nov. 29, 2011    (NL) ........................................ 2007888

(51) Int. Cl.
    *A22C 17/00*    (2006.01)
(52) U.S. Cl.
    USPC .......................................................... 452/135
(58) Field of Classification Search
    USPC .................................................. 452/135–140
    See application file for complete search history.

(56) References Cited

U.S. PATENT DOCUMENTS

| | | | |
|---|---|---|---|
| 3,837,699 A * | 9/1974 | Anderson et al. | 452/187 |
| 4,727,623 A * | 3/1988 | Durand | 452/125 |
| 5,203,736 A * | 4/1993 | Schulte et al. | 452/135 |
| 5,277,649 A | 1/1994 | Adkison | |
| 6,024,636 A | 2/2000 | Hazenbroek | |
| 6,152,816 A * | 11/2000 | van den Nieuwelaar et al. | 452/177 |
| 7,357,707 B2 * | 4/2008 | de Vos et al. | 452/136 |
| 7,597,615 B2 * | 10/2009 | van den Nieuwelaar et al. | 452/182 |
| 7,942,730 B2 * | 5/2011 | Hagendoorn et al. | 452/125 |
| 8,105,138 B2 * | 1/2012 | Van Den Nieuwelaar et al. | 452/177 |
| 8,257,154 B2 * | 9/2012 | Seaton | 452/149 |

FOREIGN PATENT DOCUMENTS

NL    2002580    8/2010

OTHER PUBLICATIONS

Search report for NL 2007888, dated Jul. 10, 2012.

* cited by examiner

*Primary Examiner* — Richard Price, Jr.
(74) *Attorney, Agent, or Firm* — Dority & Manning, P.A.

(57) ABSTRACT

A deboner and method of deboning poultry parts is provided. An exemplary embodiment includes an infeed for the poultry parts moving in a conveying direction, and a conveyor line that is synchronized with the infeed and having a series of carriers for receiving each single poultry part in a single carrier while the poultry parts are moving in their conveying direction. Each of the carriers can be embodied with two movable, preferably swivable arms, having an open position and a closed position, wherein the open position of the carrier ensures that a poultry part is accurately received in said carrier. The closed position of the two movable arms of the carrier ensures a fixing in position of the poultry thigh received in the carrier to promote an accurate, subsequent deboning of the poultry part.

9 Claims, 6 Drawing Sheets

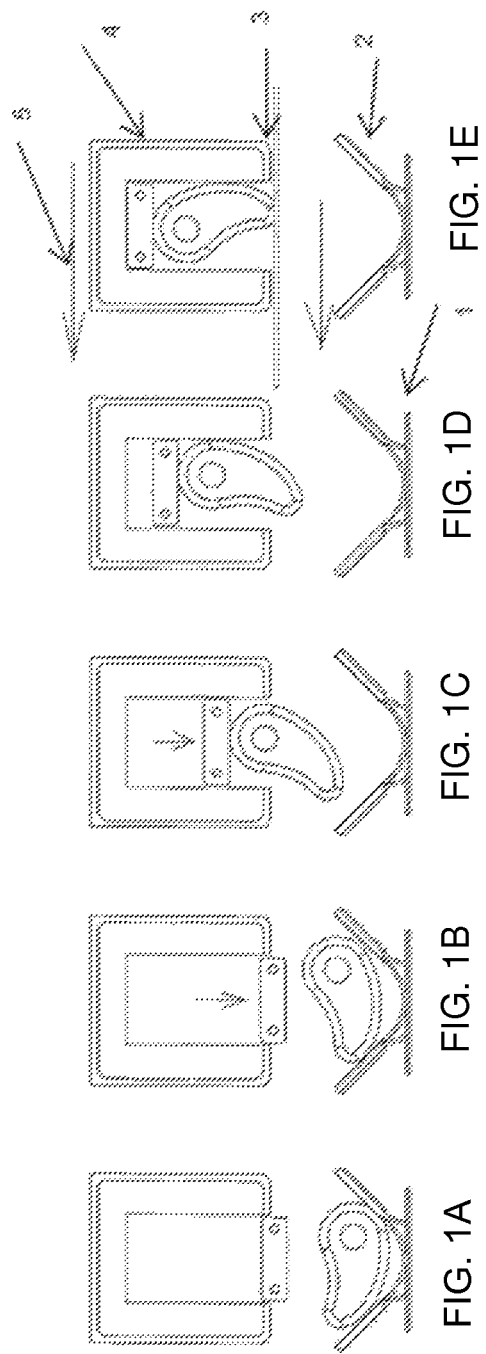

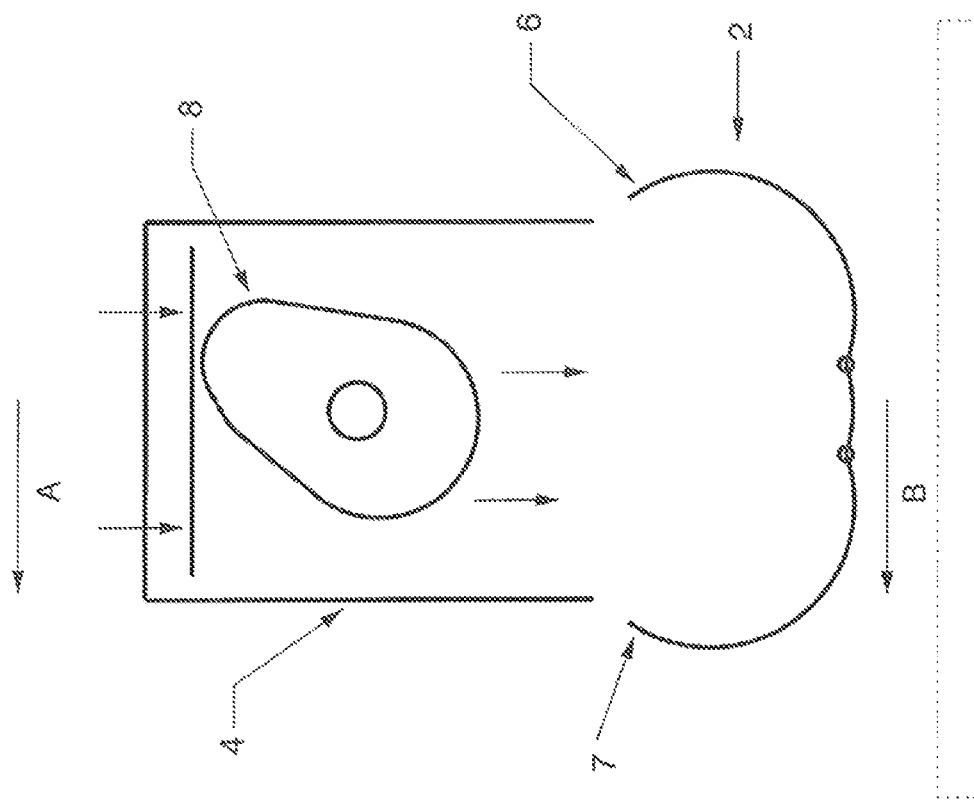

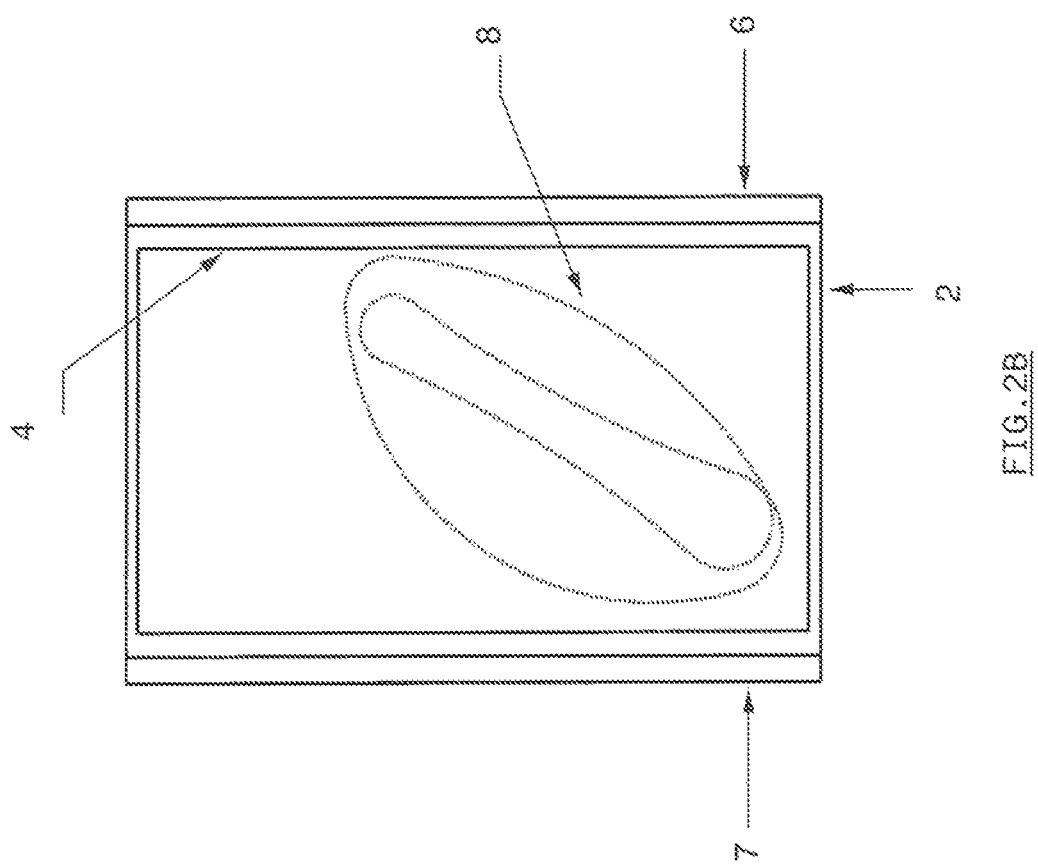

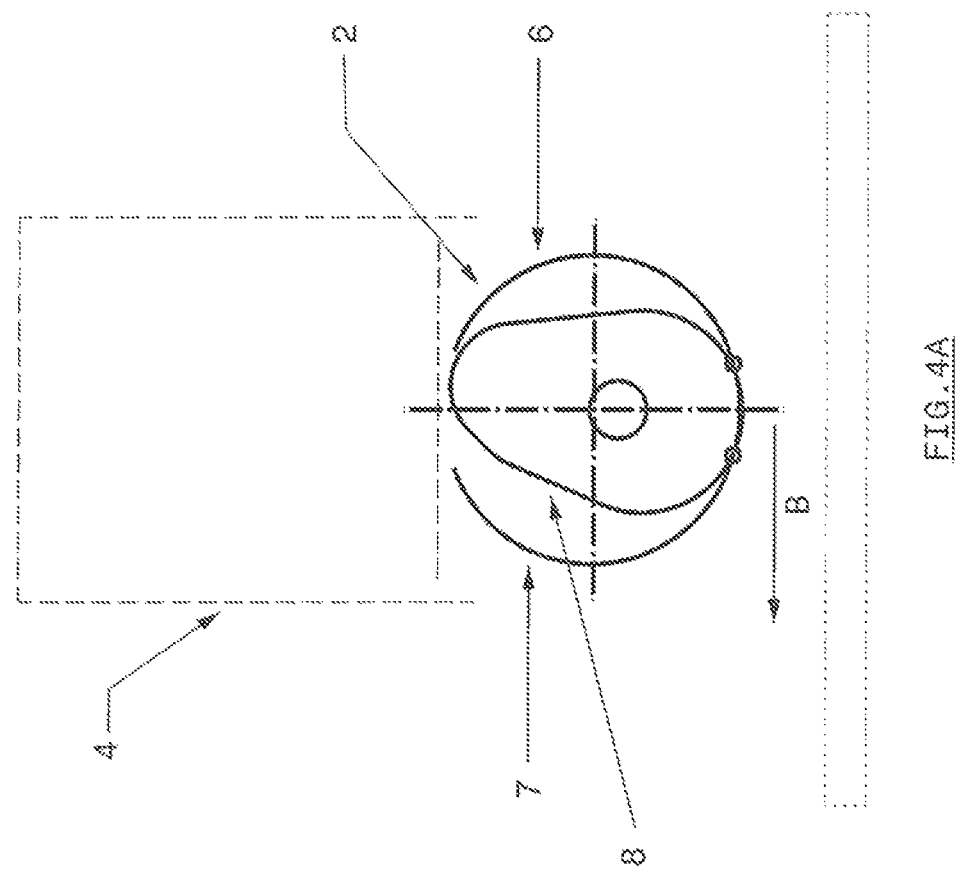

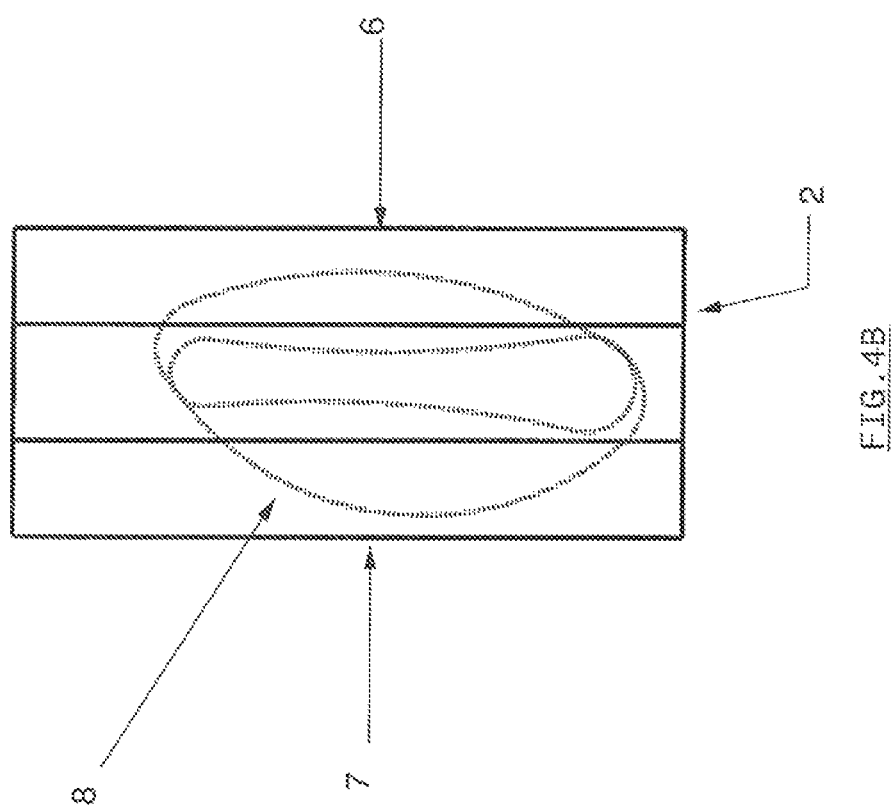

DEBONER FOR POULTRY PARTS, SUCH AS THIGHS OR DRUMSTICKS

FIELD OF THE INVENTION

The subject matter of the present disclosure relates generally to a deboner for poultry parts, such as thighs or drumsticks, and to a method of deboning poultry parts.

BACKGROUND OF THE INVENTION

Applicant's Dutch patent NL-C-2 002 580, the content of which is incorporated herein by reference, relates to a deskinner for poultry thighs. NL-C-2 002 580 mentions on its page 6, lines 15-30 with reference to FIGS. 1A through 1E as attached to this description, that: the discharge 3 of the deskinner comprises a conveyor line 1 that is provided with carriers 2 for receiving therein the deskinned thighs. Once the deskinned thighs are in the carriers 2 of the conveyor line 1, the deskinned thighs may be conveyed to a further processing device, for instance for deboning the thighs and harvesting the meat from said thighs. To this end the conveyor line 1 is driven synchronously with the preceding conveyor line 5, which latter conveyor line 5 represents the infeed for the conveyor line.

Although the apparatus according to NL-C-2 002 580 generally speaking operates satisfactorily, one object of the present invention is to increase the reliability at which the poultry parts are received in the carriers. It is a further object of the invention to increase the reliability in the deboning operation.

It is remarked that U.S. Pat. No. 5,277,649 discloses a deboner for poultry parts with a series of carriers, each single carrier equipped for receiving a single poultry part while the poultry parts are moving in their conveying direction, and wherein each of the carriers is embodied with two movable arms with an open position and a closed position. In the open position the carrier ensures that the poultry part may be reliably received therein. In the closed position, however, the poultry part is fixed in position by holding the poultry part at only one place, which is detrimental for the accurate positioning of the poultry part, particularly during deboning. A device of method that can improve over this disclosure would be useful.

SUMMARY OF THE INVENTION

The subject matter of the present disclosure relates generally to a deboner for poultry parts, such as thighs or drumsticks, and to a method of deboning poultry parts. In one exemplary aspect, the deboner includes an infeed for the poultry parts moving in a conveying direction and a conveyor line that is synchronized with the infeed. The conveyor line has a series of carriers for receiving each single poultry part in a single carrier while the poultry parts are moving in their conveying direction.

Although the deboner of the invention can be applied with reference to any type of poultry part, for ease of understanding the following disclosure makes particular reference to poultry thighs. It is to be understood, however, that the invention and the claims to which it relates are not restricted to the processing of poultry thighs but concerns the processing of poultry parts in general. Correspondingly the invention is also embodied in a method of deboning poultry parts.

Additional aspects and advantages of the invention will be set forth in part in the following description, or may be obvious from the description, or may be learned through practice of the invention. These objects and further advantages that may become apparent from the following disclosure are promoted by the application of a deboner and a method of deboning in accordance with one or more of the appended claims.

According to one exemplary aspect of the invention, each of the carriers is embodied with two movable, preferably swivable, arms having an open position and a closed position, wherein the open position of the carrier ensures that a poultry part is reliably received in the carrier and that in the closed position the two movable arms entirely encircle or envelop the poultry part longitudinally, which means along its length. By the application of two movable arms, the opening of the arms of the carrier for receiving the moving poultry parts can be arranged large enough to never miss a poultry part released from the infeed. The reliability of the subsequent deboning operation is facilitated by arranging that, in the closed position, the two movable arms entirely encircle or envelop the poultry part in its longitudinal direction, which again means along its length. The ease and reliability of operation is particularly promoted by arranging the movable arms as swivable arms.

According to another exemplary aspect of the invention, the closed position of the two movable, preferably swivable, arms of the carrier that entirely envelop the poultry part ensures a fixing in position of the poultry part received in the carrier at multiple places so as to promote that the poultry part is stably positioned enabling an accurate subsequent deboning of the poultry part. In this respect reference is also made to EP-B-0 859 550 which is differs from the deboner of the invention in that it applies an intermittently driven conveyor line that stands still when it receives the poultry parts and moves thereafter to convey the poultry parts to a location where deboning occurs. It also differs from the deboner of the invention in that it uses complicated machinery by which holding the poultry parts with clamps is functionally separated from maintaining the poultry parts in position for deboning with movable centering dishes. Due to the less complicated design of the deboner of the invention, it is less prone to malfunctioning apart from being cheaper to manufacture, whilst further the repeatability of the deboner of the invention is deemed improved over the prior art.

It is remarked that the design of the means for actuating the movable arms from the open position to the closed position and vice versa is a matter of routine design engineering falling within the capabilities of any mechanical engineer. A further disclosure of how this can be implemented can therefore be dispensed with. Suffice it to say that the movable, preferably swivable, arms can for instance be embodied as cam-actuated arms that follow a predefined track in the conveying direction of the carriers.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIGS. 1A, 1B, 1C, 1D, and 1E provide a schematic views at the infeed side of a deboner for poultry thighs according to the prior art.

FIGS. 2A and 2B provide schematic views of the operation at the infeed side of an exemplary deboner the present invention, as employed for the deboning of poultry thighs. It is however expressly pointed out that the deboner of the invention can also be applied to other poultry parts.

FIGS. 4A and 4B provide schematic views of the operation at the infeed side of an exemplary deboner the present invention, as employed for the deboning of poultry thighs.

Wherever in the figures the same reference numerals are applied, these numerals refer to the same parts.

DETAILED DESCRIPTION OF THE INVENTION

Figure 3:
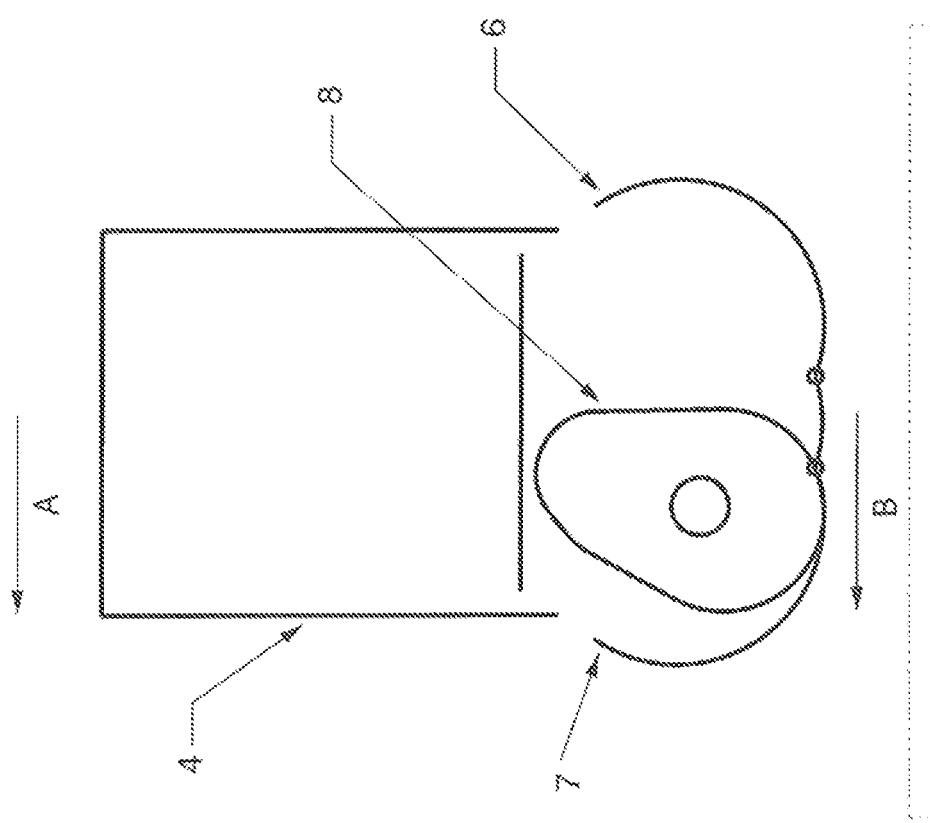
FIG. 3 provides another schematic view of the operation at the infeed side of an exemplary deboner the present invention, as employed for the deboning of poultry thighs.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

In the foregoing, a brief discussion of the operation at the infeed side of the deboner according to the prior art has been offered. FIGS. 2-4 show that in this exemplary embodiment of the invention, the receptacles 4 from which the poultry thighs 8 are released move in direction A and synchronously with the movement of the receptacles 4 the carriers 2, which receive the poultry thighs 8 and move in direction B.

Differentiating from the deboner of the prior art, for this exemplary embodiment of the invention, each of the carriers 2 (a single one of which is shown in FIGS. 2-4 moving in the direction A) is embodied with two movable arms 6, 7 having an open position (FIG. 2A a side view, FIG. 2B a top view, and FIG. 3 a side view) and a closed position (FIG. 4A a side view; FIG. 4B a top view), wherein the open position (FIGS. 2A, 2B and 3) of the carrier 2 ensures that a poultry thigh 8 is at all times accurately received in the carrier 2. This is symbolized with the transition of the poultry thigh 8 at the infeed where it moves out of the receptacle 4 to be eventually received in the carrier 2 as shown in FIG. 3. It is further remarked that the figures show that in preferred embodiment the movable arms are swivable arms 6, 7.

FIGS. 4A and 4B show that subsequent to the poultry thigh 8 being received in the carrier 2, the swivable arms 6, 7 of the carrier 2 are moved to the closed position wherein the two movable arms 6, 7 entirely encircle or envelop the poultry part 8 which ensures a fixing in position of the poultry thigh 8 received in said carrier 2 so as to promote an accurate subsequent deboning of the poultry thigh 8. The execution of this deboning can for instance be done by known means with a pusher rod that pushes the bone out of the poultry thigh which is kept fixed in position by the closed movable arms 6, 7 of the carrier 2. An example of such a known pusher rod is for instance disclosed in EP-B-0 859 550.

It is finally expressly remarked that the claims and the invention to which it relates are not to be considered restricted to the specific exemplary embodiment as shown in the figures as discussed herein-above. This exemplary embodiment and its description merely serves to elucidate the terms of the claims without intend to restrict the scope of these claims to anything else than is consistent with their wording. The scope of protection that the invention merits should therefore only be decided in relation to the wording of the claims whereas any possible ambiguity in respect of these claims should be resolved with reference to the given example.

The invention claimed is:

1. A deboner for poultry parts such as thighs or drumsticks, the deboner comprising:
    an infeed for the poultry parts moving in a conveying direction,
    a conveyor line that is synchronized with the infeed, the conveyor line comprising:
        a series of carriers for receiving each single part in a single carrier while the poultry parts are moving in the conveying direction, wherein each of the carriers includes two movable arms having an open position and a closed position, wherein the open position of the carrier ensures that a poultry part is reliably received in said carrier and that in the closed position the two movable arms entirely encircle or envelop the poultry part along its length.

2. The deboner for poultry parts as in claim 1, wherein the closed position of the two movable arms of the carrier ensures a fixing in position of the poultry part received in said carrier so as to promote an accurate subsequent deboning of the poultry part.

3. The deboner for poultry parts as in claim 2, wherein the two movable arms are swivable arms.

4. A method for deboning poultry parts, such as thighs or drumsticks, the method comprising the steps of
    moving the poultry parts along a conveying direction;
    receiving a separate poultry part into a single carrier; and
    fixing the position of the poultry in the single carrier using carrier parts that completely encircle or envelop the poultry part along its length so as to promote an accurate and subsequent deboning of the poultry part.

5. The method of deboning poultry parts as in claim 4, wherein said step of fixing further comprises moving the carrier parts towards each other to completely encircle or envelop the poultry part along its length so as to promote an accurate and subsequent deboning of the poultry part.

6. The method of deboning poultry parts as in claim 4, wherein said step of fixing further comprises rotating the carrier parts towards each other to completely encircle or envelop the poultry part along its length so as to promote an accurate and subsequent deboning of the poultry part.

7. The method of deboning poultry parts as in claim 4, wherein the carrier parts comprise swivable arms that are configured to swivel between an open position in which a poultry part can be received into the carrier and a closed position in which a poultry part can be completely encircled or enveloped therein.

8. A deboner for poultry parts, the deboner comprising:
    an infeed for providing the poultry parts, the infeed moving in a conveying direction;
    a conveyor line that moves in synchronization with the infeed, the conveyor line comprising
        a series of carriers, each carrier configured for receiving at least one of the poultry parts while the poultry parts are moving in the conveying direction;
        a pair of swivable arms connected with each carrier, the movable arms configured for swiveling towards and away from each other between a closed position and an open position, wherein the open position of the carrier ensures that a poultry part is reliably received in the carrier and that in the closed position the two movable arms enclose or envelop the poultry part within the carrier.

9. The deboner for poultry parts as in claim 8, wherein in the closed position the poultry parts can be completely encircled or enveloped within the carriers and swivable arms so as to completely encircle or envelop the poultry part along its length.

\* \* \* \* \*